United States Patent

[11] 3,616,255

[72] Inventor Atsushi Nakagawa
    Tokyo, Japan
[21] Appl. No. 667,673
[22] Filed Sept. 14, 1967
[45] Patented Oct. 26, 1971
[73] Assignee Asahi Breweries Ltd.
    Tokyo, Japan
[32] Priority Sept. 21, 1966
[33] Japan
[31] 41/61956

[54] METHOD AND DEHYDRATED MEDIUM PERMITTING EASY DETECTION OF BEER LACTIC ACID BACTERIA
6 Claims, No Drawings

[52] U.S. Cl....................................... 195/103.5, 195/100
[51] Int. Cl........................................ C12k 1/06
[50] Field of Search............................ 195/100, 101, 102, 103.5

[56] References Cited
UNITED STATES PATENTS
2,708,178  5/1955  György.......................... 195/103.5

OTHER REFERENCES

Thorne; K. J. I., et al., " Biochem. Biophys. Aeta," 59:273 (1962)
Levine; M., et al., A compilation of Culture Media (1930)
Difco Manual 1953
Prescott et al., Industrial Microbiology, 1959
Rose, Industrial Microbiology, pp. 129- 130 (1961)
Frobisher, Fundamentals of Microbiology, pg. 302, 7 th Ed. (1965)
Pratt, Antibiotics, pg. 197 (1949)

Primary Examiner—Alvin E. Tanenholtz
Assistant Examiner—Max D. Hensley
Attorney—Woodhams, Blanchard and Flynn ABSTRACT: A dehydrated medium for permitting easy detection of beer lactic acid bacteria, which medium is prepared by adding a small amount of acetates and mevalonic acid to a dehydrated nutritional medium whose principal components consist of nitrogen source, carbon source, inorganic salts, growth factors for beer lactic acid bacteria and a small amount of agar.

METHOD AND DEHYDRATED MEDIUM PERMITTING EASY DETECTION OF BEER LACTIC ACID BACTERIA

BACKGROUND OF THE INVENTION

1. Field of the Invention

The present invention relates to a dehydrated medium for permitting easy detection of lactic acid bacteria which contaminate beer during the brewing process, i.e., the so-called beer lactic acid bacteria, and also relates to a method for preparing such a dehydrated medium.

2. Description of the Prior Art

Various bacteria which contaminate wort or beer during the brewing process are known. Among these bacteria, those which can grow in beer are limited to certain hop-tolerant lactic acid bacteria. More specifically, bacteria which are able to contaminate beer during the brewing process include thermobacteria, flavobacteria and acetic acid bacteria, besides lactic acid bacteria. The first two are acid sensitive, and cannot grow where the pH is 5 or less. Acetic acid bacteria, on the other hand, are aerobic by nature, and they cannot grow under anaerobic conditions such as in the fermenting beer or product beer where carbon dioxide is present.

Also, in growth of a majority of the types of lactic acid bacteria are suppressed by virtue of the antibiotic property of the hop-bitter substances. Only such lactic acid bacteria which resist the hop antiseptic power can survive and grow through the entire brewing process. According to Bergey's Manual of Determinative Bacteriology, 7th Edition, 1957, the taxonomical position of these surviving lactic acid bacteria is such that, among Lactobacillaceae, rods are classified as Lactobacillus pastorianus, while cocci are grouped as Pediococcus cerevisiae. When these bacteria grow in beer, not only will such beer unavoidably become turbid, but also it will present a sour taste due to lactic acid fermentation, and further an unpleasant flavor will be imparted to the beer due to diacetyl which is formed by these pediococci. It is, therefore, necessary, not only in breweries which are contaminated by beer-spoiling lactic acid bacteria as a matter of fact, but also in those breweries not considered to be free from such contamination, to provide means for quickly and accurately detecting the presence of these bacteria in order to effect proper biological control of the plant facilities. The majority of these harmful lactic acid bacteria, however, prefer to grow under anearobic conditions, and moreover, their growth rate is relatively low. Furthermore, they are very fastidious in their nutritive requirements. As such, not only has there not been proposed any simple and effective method for their detection, despite the knowledge that they adversely affect the brewing of beer, but also their detection itself has been considered to be very difficult. In fact, in the U.S.A. and Europe there have been proposed only the following several methods for detecting beer lactic acid bacteria, which methods are suitable for use in beer breweries. More specifically, these prior methods include those which use Williamson's medium and which use Difco's W. L. nutrient medium, both being in the form of a dehydrated medium, and those which use a natural media, for example, alkali-added wort, starch-turbid beer, autolysate of yeast (yeast extract) and tomato juice. However, these media of the prior art which were used in the detection of beer-spoiling lactic acid bacteria had the shortcomings that they required rather complicated procedures to prepare, or that they allowed the cogrowth of other kinds of beer-spoiling bacteria, or that they did not permit the growth of hop-tolerant harmful bacteria, or that the growth rate of the hop-tolerant lactic acid bacteria was very low. Besides, these prior methods resorted to a procedure, in conducting an anaerobic culturing in which the media were first subjected to plate-culturing on Petri dishes and then they were refilled with carbon dioxide by the use of a vacuum desiccator. Thus, the prior methods had the inconveniences that they required particular means of creating anaerobic conditions and that they did not permit followup observation after the passage of time.

SUMMARY OF THE INVENTION

In view of the foregoing inconveniences of the prior art, the inventor conducted extensive research on various bacteria which would cause contamination of beer during the brewing process and especially on the taxonomical position, the characteristics and the nutritional requirements, of lactic acid bacteria which are related to beer. As a result, the inventor has successfully found a media which permit the growth exclusively of beer lactic acid bacteria. The present invention has been worked out based on this finding.

The media of the present invention are made by adding acetates and mevalonic acid to dehydrated nutritional media whose principal components consist of a nitrogen source, a carbon source, inorganic salts, growth factors for beer lactic acid bacteria and a small amount of agar.

DESCRIPTION OF A PREFERRED EMBODIMENT

An example of the compositions of the dehydrated medium for use in the detection of beer lactic acid bacteria is shown in table 1.

Table 1

| | |
|---|---|
| Yeast-extract | 5 g. |
| Peptone | 5 s. |
| Glucose | 16.2 g. |
| Sodium-acetate (anhydrous) | 8 g. |
| Monopotassium phosphate | 0.2 g. |
| Potassium chloride | 0.5 g. |
| Sodium thioglycolate | 1 g. |
| $l$-cystine b | 1 g. |
| Agar (powder) | a small amount |
| Citric acid | 2.2 g. |
| Calcium chloride | 0.1 g. |
| Magnesium sulfate | 0.1 g. |
| Manganese sulfate | 1 mg. |
| Ferric chloride | 1 mg. |
| Resazurin (sodium salt) | 3 mg. |
| Mevalonic acid | 5 mg. |
| Actidione | 5 mg. |

In order to conduct the detection of beer lactic acid bacteria by the use of a dehydrated medium of the foregoing composition, it is only necessary to add about 3 to 5 percent by weight of this dehydrated medium to water, and then heat to dissolve the composition in the heated water. The resulting solution is immediately poured into a test tube and cooled. A sample to be tested is then placed in the test tube and is incubated at about 25° C. By conducting incubation in this manner, there will occur, in case there are any lactic acid bacteria in the sample, the formation of colonies which will come out in the form of being suspended in the semisolid medium. Thus, the presence of the organisms can be readily detected. It is to be noted, however, that in case the medium is prepared by dissolving said composition in water as described above, the medium will also permit the growth of lactic acid bacteria other than the hop-tolerant strain. Where it is desired to detect only the hop-tolerant strain, it is only necessary to add an appropriate amount of beer to the dehydrated medium. Also, in case is is desired to obtain an accurate count of the number of organisms, it is only necessary to increase the amount of agar contained in the composition of the aforesaid dehydrated medium to effect a high-layer culture. During the process of incubating micro-organisms which is conducted for the aforesaid purpose, the oxidation-reduction indicator which is contained in the detecting medium changes its color in proportion to the potential of reduction and oxidation, to indicate whether or not the anaerobic culture done by the reducing agents contained in this medium is still being effectively performed.

When, in conducting the culture, it is believed that a number of acetic acid bacteria are present in the sample to be tested, a layer of agar is placed on top of the medium which has been already prepared in such manner as to permit effective culture and contained in a test tube. By doing so, the growth of such aerophilic organisms which would grow on the top face of the medium can be completely inhibited, with the result that the desired detection is accomplished.

The result of the observation on the growth of various micro-organisms in a medium prepared with the composition shown in table 1 (consisting of about 4 percent by weight of medium and 50 percent by weight of beer) after 4 to 6 days' incubation at 25° C. is shown in table 2.

Table 2

| Kinds of organisms | Species | Growth |
| --- | --- | --- |
| Yeast | Saccharomyces carlsbergensis | |
| | Saccharomyces cerevisiae | |
| Mold | Penicillium notatum | |
| | Aspergillus oryzae | |
| Bacteria | Acetobacter | |
| | Aerobacter aerogenes | − |
| | Escherichia coli | − |
| | Micrococcus | − |
| | Sarcina | − |
| | Bacillus subtilis | − |
| Lactic acid bacteria | | |
| | Streptococcus faecalis | − |
| | Lactobacillus plantarum | − |
| Hop-tolerant bacteria | | |
| | Pediococcus cerevisiae | + |
| | Pediococcus mevalovorus | + |
| | Lactobacillus brevis | + |

As is clear from the above test, the incubation of bacteria by the use of the medium of the present invention completely inhibits the growth of micro-organisms related to beer other than the hop-tolerant strains because of the following reasons.

Specifically, bacteria which contaminate beer during the brewing process include, as has been described, thermobacteria, flavobacteria, acetic acid bacteria, micrococci, sarcinae and lactobacilli. It is to be noted that the growth of bacteria such as termobacteria and flavobacteria can be suppressed by the use of acetic acid as a component of the medium used. Furthermore, the growth of all of the above-listed bacteria except lactic acid bacteria is suppressed when the pH is reduced by the use of citric acid and by conducting anaerobic culture by the use of sodium thioglycolate and $l$-cystine. In addition, sodium acetate provides a buffer action and serves to prevent the marked drop of pH of the medium which would be caused by the lactic acid produced from the rapidly growing lactic acid bacteria. Also, the addition of the reducing agents, namely, sodium thioglycolate and $l$-cystine, serves to suppress the growth of aerophilic bacteria. Besides these reducing agents, $l$-ascorbic acid and erythorbic acid can also be used.

Furthermore, the growth of lactic acid bacteria other than the hop-tolerant strain can be suppressed by the addition of beer or hop-extract to the dehydrated medium. Also, the growth of acetic acid bacteria, bacilli and molds is suppressed by the addition of reducing agents to the medium.

Moreover, the growth of brewer's yeasts containing culture yeast is suppressed by the addition of actidione to the medium. Pediococcus mevalovarus which is a strain of beer sarcinae indispensably requires the supply of mevalonic acid for its growth. Although mevalonic acid is present in beer, it is necessary, when only a synthetic medium is used, to add mevalonic acid in the order of 2 p.p.m. or more to the medium.

As has been described, the present invention makes the preparation of media quite easy and permits selective culture of beer lactic acid bacteria, and as a result, the present invention greatly facilitates and simplifies the detection of such micro-organisms. Thus, the present invention is industrially quite useful as a means of detecting beer-spoiling lactic acid bacteria of the aforesaid kinds.

What is claimed is:

1. A dehydrated medium capable of being dissolved in water and used for detecting beer lactic acid bacteria, consisting essentially of a nitrogen source; a carbon source; mineral salts; acetate; citric acid; agar; resazurin; mevalonic acid; actidione; and one or more reducing agents selected from the group consisting of sodium thioglycolate, $l$-cystine, $l$-ascorbic acid and erythorbic acid.

2. A dehydrated medium according to claim 1, which contains the following constituents in substantially the amounts specified in parts by weight:

| | |
| --- | --- |
| Yeast extract | 5 |
| Peptone | 5 |
| Glucose | 16.2 |
| Sodium acetate (anhydrous) | 8 |
| Monopotassium phosphate | 0.2 |
| Potassium chloride | 0.5 |
| Sodium thioglycolate | 1 |
| $l$-cystine | 1 |
| Agar (powder) | a small amount |
| Citric acid | 2.2 |
| Calcium chloride | 0.1 |
| Magnesium sulfate | 0.1 |
| Manganese sulfate | 0.001 |
| Ferric chloride | 0.001 |
| Resazurin (sodium salt) | 0.003 |
| Mevalonic acid | 0.005 |
| Actidione | 0.005 |

3. A method for detecting beer lactic acid bacteria, comprising inoculating a sample to be tested into an aqueous solution of a culture medium composed of a nitrogen source; a carbon source; mineral salts; acetate; citric acid; agar; resazurin; mevalonic acid; actidione; and one or more reducing agents selected from the group consisting of sodium thioglycolate, $l$-cystine, $l$-ascorbic acid and erythorbic acid; and then incubating the culture medium.

4. A method according to claim 3, where the aqueous solution of the culture medium also contains about 50 percent by weight of beer which is sufficient to inhibit the growth of lactic acid bacteria, except for the hop-tolerant strains thereof.

5. A method according to claim 3, in which the culture medium contains the following constituents in substantially the amounts specified in parts by weight:

| | |
| --- | --- |
| Yeast extract | 5 |
| Peptone | 5 |
| Glucose | 16.2 |
| Sodium acetate (anhydrous) | 8 |
| Monopotassium phosphate | 0.2 |
| Potassium chloride | 0.5 |
| Sodium Thioglycolate | 1 |
| $l$-cystine | 1 |
| Agar (powder) | a small amount |
| Citric acid | 2.2 |
| Calcium chloride | 0.1 |
| Magnesium sulfate | 0.1 |
| Manganese sulfate | 0.001 |
| Ferric chloride | 0.001 |
| Resazurin (sodium salt) | 0.003 |
| Mevalonic acid | 0.005 |
| Actidione | 0.005 | the culture medium comprising from about 3 to 5 percent by weight of the aqueous solution.

6. A method according to claim 3, including the step of placing a layer of agar on top of the aqueous solution after inoculation thereof.

* * * * *